(12) United States Patent
Das et al.

(10) Patent No.: US 10,432,826 B2
(45) Date of Patent: Oct. 1, 2019

(54) AUTOMATIC SUPPRESSION OF UNRECOGNIZED SPOT COLORS FROM A RASTER IMAGE

(71) Applicant: Xerox Corporation, Norwalk, CT (US)

(72) Inventors: Arindam Das, Konnagar (IN); David C. Robinson, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/593,548

(22) Filed: May 12, 2017

(65) Prior Publication Data
US 2018/0332195 A1 Nov. 15, 2018

(51) Int. Cl.
*H04N 1/60* (2006.01)
*H04N 1/54* (2006.01)

(52) U.S. Cl.
CPC ............ *H04N 1/6097* (2013.01); *H04N 1/54* (2013.01); *H04N 1/603* (2013.01); *H04N 1/6008* (2013.01); *H04N 2201/0082* (2013.01)

(58) Field of Classification Search
CPC ............... H04N 1/6097; H04N 1/6008; H04N 2201/0082
USPC .................................. 358/1.9, 1.15, 518, 448
See application file for complete search history.

(56) References Cited

U.S. PATENT DOCUMENTS

| | | | |
|---|---|---|---|
| 6,157,469 A | 12/2000 | Mestha | |
| 6,226,103 B1 | 5/2001 | Klassen et al. | |
| 7,009,733 B2 | 3/2006 | Gruzdev et al. | |
| 7,593,138 B2 | 9/2009 | Barnes | |
| 7,612,926 B2 | 11/2009 | Jodra et al. | |
| 8,120,812 B2 | 2/2012 | Sharma et al. | |
| 8,564,828 B2 | 10/2013 | Farrell et al. | |
| 8,736,930 B2 | 5/2014 | Robinson et al. | |
| 8,870,319 B2 | 10/2014 | Maltz et al. | |
| 8,892,995 B2 | 11/2014 | Hoppenot et al. | |
| 8,902,482 B2 | 12/2014 | Shinohara | |
| 9,070,076 B1 | 6/2015 | Smith et al. | |
| 9,547,810 B2 | 1/2017 | Corr et al. | |
| 2006/0098233 A1 | 5/2006 | Jodra et al. | |
| 2007/0002343 A1 | 1/2007 | Butterfield et al. | |
| 2011/0242562 A1 | 10/2011 | Vrhel | |
| 2012/0090488 A1 | 4/2012 | Postle et al. | |
| 2012/0300232 A1* | 11/2012 | Kouguchi | H04N 1/6022 358/1.9 |

(Continued)

OTHER PUBLICATIONS

Bob Lag, "Pantone spot colour & Transparency dont work", https://forums.adobe.com/thread/1118309, Dec. 20, 2012, pp. 1-6.

*Primary Examiner* — Quang N Vo
(74) *Attorney, Agent, or Firm* — Gibb & Riley, LLC

(57) ABSTRACT

According to exemplary methods, a print job is received into a computerized device. The computerized device includes a marking device having a programmed color space. The print job includes an electronic document and print job attributes with a spot color for use in rendering the print job. Raster processing of the electronic document is performed. An object in the electronic document involving the spot color is identified. Definition of the spot color is verified for the marking device. Responsive to the spot color not being defined for the marking device, color values for each pixel in the object are modified to zero. Overprint is enabled for the object so that underlying objects will show through.

20 Claims, 9 Drawing Sheets

(56) References Cited

U.S. PATENT DOCUMENTS

2013/0088728 A1* 4/2013 Chen .................. H04N 1/54
358/1.9

* cited by examiner

AUTOMATIC SUPPRESSION OF UNRECOGNIZED SPOT COLORS FROM A RASTER IMAGE

BACKGROUND

Systems and methods herein generally relate to machines having print engines such as printers and/or copier devices and, more particularly, to printer color management in image/text printing.

The color gamut of a printer is a multi-dimensional space of a given volume with the axes of the space being set or defined initially by the pigments used in the colorants of the primary colors. Each set of color primaries: red, green, blue (RGB) or cyan, magenta, yellow, and black (CMYK), defines a "color space" that includes all colors that can result from any combination of these primaries. The "color space," or "color gamut," may be quite different for different sets of primaries. Typically, a CMYK color gamut is smaller than (although not completely within) an RGB color gamut, which means that the monitor can display more colors than a printer can print. In forming multi-color output images on an image-receiving medium, each of the primary colors is transferred to the image-receiving medium in turn. The color gamut is defined by the interaction of the primary colors, and is limited by a total amount of colorant in any combination that can be effectively deposited on the image-receiving medium. In other words, it is not possible to print some colors that can be photographed or displayed on a monitor when using CMYK printing. The color gamut for a particular image forming device and an associated color rendition dictionary (CRD) by which images may be produced by the image forming device is usually stored in metadata with the image forming device. The CRD and associated set of set points programmed into the image forming device, or family of image forming devices, ensures that the color gamut produced by that image forming device covers, as broadly as possible, an available standard color spectrum.

Some printers enable additional process colors for rendering an object. Such printers may include an additional housing (sometimes referred to as the fifth color housing, or Xth housing if more than 5 are enabled) that holds replaceable printing modules (sometimes referred to as a customer replaceable unit (CRU), fifth color module, spot color module, or imaging media cartridges) that are separate from the permanent color printing modules. This allows switching of the replaceable printing modules seamlessly in minutes; however, the fifth colorants are more expensive and used less frequently than the printer's permanent colors.

Extended gamut colorant destination profiles are designed to use the extended colorant in regions of the color space that cannot be rendered accurately by the main colors alone. The reason why the extended gamut colorant is used in these regions is to extend the printing gamut beyond the CMYK limitations.

Spot colors for printing are typically specially mixed inks that can be applied by an offset printing press. These specially mixed inks give a precise match to a designated color. Xerographic print devices do not have the ability to use the specialized inks and perform a best match with the CMYK colorants available. When a spot color is designated in a PDL (page description language) file, the Digital Front End (DFE) of the Xerographic print device consults a table of CMYK recipes (or a CIELAB value) for the best match possible. (The DFE is a component of the Xerographic print device that prepares and processes a job for the printer.) If a spot color name is not in the DFE table, an alternate color space value designated within the PDL is used. Each color typically has a CMYK recipe for an idealized printer (the CMYK colorants for a given print system vary, so the result of the same CMYK recipe on multiple print engine will vary in appearance).

Printing systems may also use specialty spots that are designated for colorants that cannot be reasonably mimicked using CMYK mixtures. These colorants include white, clear, and metallic, such as silver and gold. If these colorants are not available, the user does not want a CMYK facsimile of the color using the alternative color space designated within the PDL. Accordingly, there remains a need to provide a strategy to overcome the problem of undefined spot colors, within the DFE, in order to generate the user's desired image quality.

SUMMARY

The systems and methods disclosed herein present a solution for the above-described limitation. When objects containing spot color designations are present in the page description language (PDL) of a print job and the same spot color is not contained within the system's spot recipe table then the color recipe defined within the PDL (i.e., the alternate color space) is used to render the object. According to systems and methods herein, the Raster Image Processor (RIP) will read the embedded information of such objects from the PDL and, if it is found that the spot color is designated by the user to be suppressed, then, instead of consulting an alternate color space from the PDL, the RIP will create an alternate color space with default tint values as zero. In addition, if such object, using the suppressed spot color, is placed on top of any other object, the suppressed object will behave as an overprint, allowing any objects below to show through. Overprint processing is performed by coloring an underlying region of a background object in image data overlapped by a foreground object. This coloring of the underlying region is performed with the color of the foreground object while leaving the color of the background object as is. In other words, in this case, the suppressed object is designated as transparent by the default tint values so that other objects occupying the same image region are not obscured.

Exemplary printing devices herein include (among other components) a print engine electrically connected to a processor. The print engine has permanent color printing modules and may include additional printing modules electrically connected to the processor. The permanent color printing modules are permanently mounted within the printer and contain main colors. Each of the permanent color printing modules contains a single one of the main colors. The additional printing modules (if any) are temporarily loaded within the printer and contain optional colors to extend the available color gamut. Each of the switchable printing modules contains a single one of the optional colors.

In operation, the processor receives a print job, and the processor automatically raster image processes print data in the print job to produce a bitmap for printing the print job with the colors available to the printing device, which may include one of the optional colors. The processor automatically converts the bitmap into a printable color space (e.g., CMYK) to produce a printable bitmap for the designated printing colorants. The processor also automatically identifies a main color gamut of the print engine for printing with only the main colors.

Systems and methods herein present a method to suppress the printing of unwanted/undesired spot color calls and associated adverse effects when ripping an image from a PDL (page description language) file. Currently a spot colorant that is not present in a printer is rendered with the available CMYK (cyan, magenta, yellow, and black) colorants, which is often not desired by customers, especially when that color is not contained within the gamut of the available colorants. A solution is provided by allowing users to "suppress" an unwanted spot color. The suppression can take the form of the CMYK definition of the spot color being set to zero and the associated object of that spot color having Overprint set to ON so that other overlapping objects are rendered instead. The suppression can be enabled through a Graphical User Interface option available to the customer.

According to exemplary methods herein, a print job is received into a computerized device. The computerized device includes a marking device having a programmed color space. The print job includes an electronic document and print job attributes with a spot color for use in rendering the print job. Raster processing of the electronic document is performed. An object in the electronic document involving the spot color is identified. Definition of the spot color is verified for the marking device. Responsive to the spot color not being defined for the marking device, color values for each pixel in the object are modified to zero.

According to exemplary methods herein, a print job is received into a computerized device. The computerized device includes a marking device. The print job includes an electronic document. A menu option is displayed on a user interface of the computerized device. The menu option is to suppress spot colors in the electronic document. The spot colors to suppress are selectable. Raster processing of the electronic document is performed. The raster processing produces a bitmap including pixel values for each element of the electronic document. An object in the electronic document involving a spot color is identified. The spot color is evaluated according to a programmed color space of the marking device. Input is received into the user interface to suppress spot colors that are not defined in the programmed color space. Responsive to the spot color not being defined for the marking device, color values for each pixel in the object are modified to zero. The print job is output using modified color values.

A printing device herein includes an input device receiving a print job. The print job includes an electronic. A processor is operatively connected to the input device. A print engine is operatively connected to the processor. The processor includes a raster image processor. A user interface is operatively connected to the processor. A marking device is operatively connected to the processor. The marking device has a programmed color space. The processor displays, on the user interface, a menu option to suppress spot colors in the electronic document. The spot colors to suppress are selectable. The processor performs raster processing of the electronic document, using the raster image processor. The raster processing produces a bitmap including pixel values for each element of the electronic document. The processor identifies an object in the electronic document involving a spot color. The processor evaluates the spot color according to the programmed color space of the marking device. The user interface receives input to suppress spot colors that are not defined in the programmed color space. Responsive to the spot color not being defined for the marking device, the processor modifies color values for each pixel in the object to zero. The print job is output by the marking device using modified color values.

According to a computer system for suppressing undefined spot colors, the computer system comprises a program product comprising a tangible computer readable storage medium having program code embodied therewith. The program code is readable and executable by a computer to provide an application to perform a method. According to the method, a print job is received into a printing device. The printing device includes a marking engine having a programmed color space. The print job includes an electronic document and print job attributes with a spot color for use in rendering the print job. Raster processing of the electronic document is performed. An object in the electronic document involving the spot color is identified. Definition of the spot color is verified for the marking engine. Responsive to the spot color not being defined for the marking engine, color values for each pixel in the object are modified to zero.

These and other features are described in, or are apparent from, the following detailed description.

BRIEF DESCRIPTION OF THE DRAWINGS

Various examples of the systems and methods are described in detail below, with reference to the attached drawing figures, which are not necessarily drawn to scale and in which.

DETAILED DESCRIPTION

Figure 1:
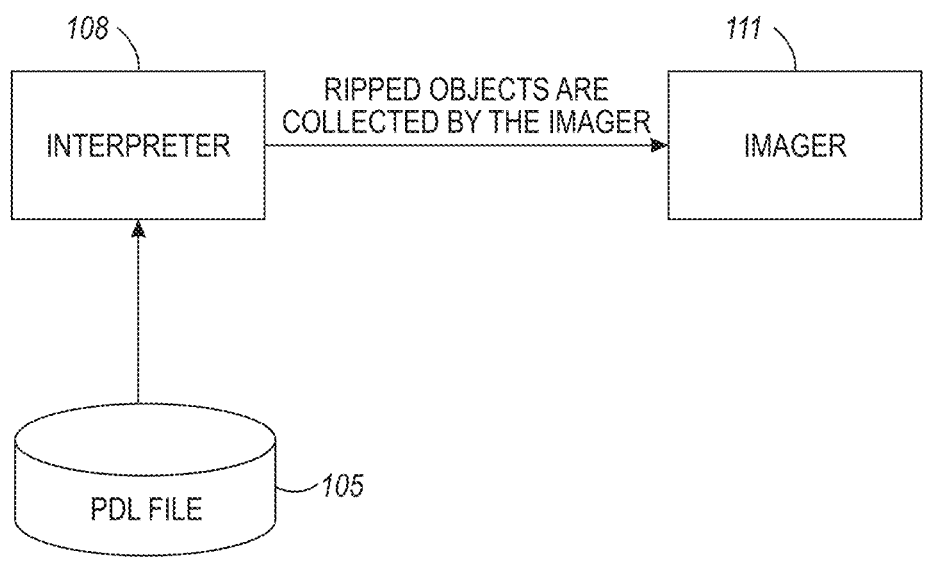
FIG. 1 is a flow diagram illustrating a broad overview of a process according to systems and methods herein.

For a general understanding of the features of the disclosure, reference is made to the drawings. In the drawings, like reference numerals have been used throughout to identify identical elements. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

As used herein, an image forming device can include any device for rendering an image on print media, such as a copier, laser printer, bookmaking machine, facsimile machine, or a multifunction machine (which includes one or more functions such as scanning, printing, archiving, emailing, and faxing). "Print media" can be a physical sheet of paper, plastic, or other suitable physical print media substrate for carrying images. A "print job" or "document" is referred to for one or multiple sheets copied from an original print job sheet(s) or an electronic document page image, from a particular user, or otherwise related. An original image is used herein to mean an electronic (e.g., digital) or physical (e.g., paper) recording of information. In its electronic form, the original image may include image data in a form of text, graphics, or bitmaps.

As shown FIG. 1, an incoming job may include a PDL file 105 that describes the appearance of a printed page according to the job. The input may be a page description using a page description language (PDL). A page description language (PDL) is a computer language that describes for the print engine the appearance of a printed page in a higher level than an actual output bitmap. The PDL file 105 specifies the arrangement of the printed page through commands for the print engine. An interpreter 108 may be used in a preprocessing step to interpret a specified number of job pages.

An exemplary processing system may include an interpreter 108 and an imager 111, as shown in FIG. 1. The interpreter 108 and imager 111 are classic components of a two-part raster image processor (RIP), such as may be used to prepare the job for printing. As would be known by one skilled in the art, a raster image processor is a component used in a printing system that produces a raster image, also known as a bitmap. The bitmap is then sent to a printing device for output. Raster image processing is the process that turns the job input information into a high-resolution raster image. The input may be a page description using a page description language (PDL) of higher or lower resolution than the output device. In the latter case, the RIP applies either smoothing or interpolation to the input bitmap to generate the output bitmap.

According to systems and methods herein, the interpreter parses the PDL file 105 according to PDL-specific language constructs, and changes these into pdl-language neutral "objects" that are presented to the imager 111 for collection. In this way, various language-specific interpreters can be mated with a single imager implementation.

All the color spaces in the PDL (e.g., RGB, CMYK, spots, separation, device N) are rendered by the raster image processor. The rendering uses the colorants available on the print device (e.g., CMYK).

To print an image, a print engine processor, sometimes referred to herein as an image processor or a raster image processor, converts the image in a page description language or vector graphics format to a bit mapped image indicating a value to print at each pixel of the image. A "pixel" refers to the smallest segment into which an image can be divided. Each pixel may represent a dot, also called a picture element. The sequence of dots forming a character is called a raster pattern. The number of dots per inch that a printer generates is called the print resolution, or density. A resolution of 240 pixels means that a printer prints 240 pixels per inch both vertically and horizontally, or 57,200 pixels per square inch (240×240).

Figure 2:
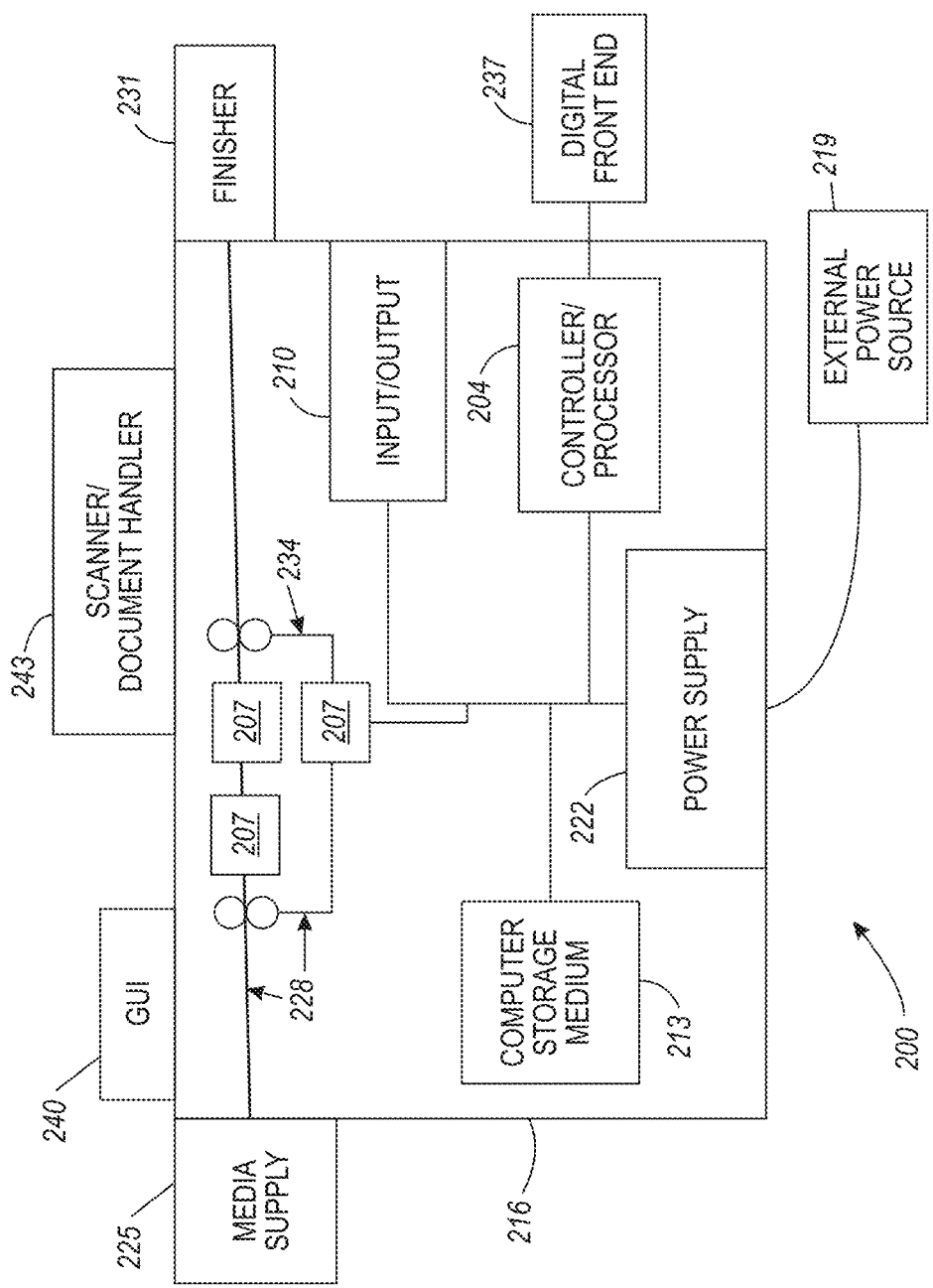
FIG. 2 is a schematic diagram illustrating printing devices herein.

FIG. 2 illustrates many components of an exemplary multi-function device (MFD) 200, which can be used with methods herein. The MFD 200 includes a controller/processor 204 and at least one marking device (print engine(s)) 207 operatively connected to the controller/processor 204. The MFD 200 may also include a communications port (Input/Output device 210) operatively connected to the controller/processor 204 and to a computerized network external to the MFD 200. The Input/Output device 210 may be used for communications to and from the MFD 200.

The controller/processor 204 controls the various actions of the MFD 200, as described below. A non-transitory computer storage medium device 213 (which can be optical, magnetic, capacitor based, etc.) is readable by the controller/processor 204 and stores instructions that the controller/processor 204 executes to allow the MFD 200 to perform its various functions, such as those described herein.

According to systems and methods herein, the controller/processor 204 may comprise a special purpose processor that is specialized for processing image data and includes a dedicated processor that would not operate like a general purpose processor because the dedicated processor has application specific integrated circuits (ASICs) that are specialized for the handling of image processing operations, processing image data, calculating pixel values, etc. In one example, the multi-function device 200 is special purpose machine that includes a specialized image processing card having unique ASICs for providing color image processing, includes specialized boards having unique ASICs for input and output devices to speed network communications processing, a specialized ASIC processor that performs the logic of the methods described herein using dedicated unique hardware logic circuits, etc. It is contemplated that the controller/processor 204 may comprise a raster image processor (RIP). A raster image processer uses the original image description to RIP the print job. Accordingly, the print instruction data is converted to a printer-readable language. The print job description is generally used to generate a ready-to-print file. The ready-to-print file may be a compressed file that can be repeatedly accessed for multiple (and subsequent) passes.

Thus, as shown in FIG. 2, a body housing 216 has one or more functional components that operate on power supplied from an external power source 219, which may comprise an alternating current (AC) power source, through the power supply 222. The power supply 222 can comprise a power storage element (e.g., a battery) and connects to the external power source 219. The power supply 222 converts the power from the external power source 219 into the type of power needed by the various components of the MFD 200.

The multi-function device 200 herein has a media supply 225 supplying media to a media path 228. The media path 228 can comprise any combination of belts, rollers, nips, drive wheels, vacuum devices, air devices, etc. The print engine 207 is positioned along the media path 228. That is, the multi-function device 200 comprises a document-processing device having the print engine(s) 207. The print engine(s) 207 prints marks on the media. After receiving various markings from the print engine(s) 207, the sheets of media can optionally pass to a finisher 231 which can fold, staple, sort, etc., the various printed sheets. As described herein, a return paper path 234 may deliver the printed sheets to the same or different print engine 207 for at least a second layer of toner/ink to be applied. Each return of the media to the print engine 207 is referred to herein as a "pass".

The print engine(s) 207 may include a color toner/ink-applying component (i.e., a source of pigmented toner) that supplies at least pigmented colorant for applying colored toner/ink to the media passing through the print engine 207.

Figure 8:
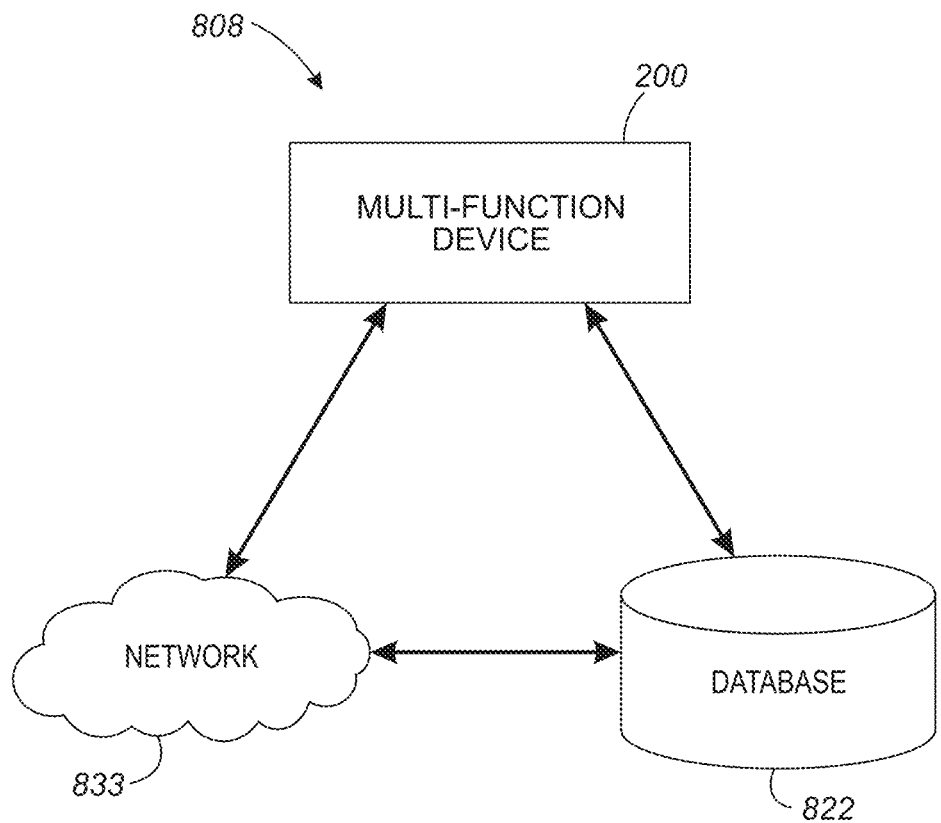
FIG. 8 is a block diagram of a network according to systems and methods herein.

A Digital Front End (DFE) 237 may be connected to the controller/processor 204 of the MFD 200. The DFE 237 prepares and processes a job for the print engine(s) 207 and may include one or more RIPs (raster image processors) that render from a page description language (PDL) such as PostScript, PDF or XPS to a raster: a pixel-based representation of the page suitable for delivery to the print heads of the print engine(s) 207. The DFE 237 is able to load files from various sources on a network, such as shown in FIG. 8, and process them in order to be printed on digital equipment, whether it be a small desktop printer or a large digital press. The controller/processor 204 takes the imposed print ready input from the DFE 237 and controls the print engine(s) 207 for printing.

In addition, the multi-function device 200 can include at least one accessory functional component, such as a user interface (GUI) 240 or other accessory functional component (such as a scanner/document handler 243, automatic document feeder (ADF), etc.) that operate on the power supplied from the external power source 219 (through the power supply 222).

As would be understood by those ordinarily skilled in the art, the multi-function device 200 shown in FIG. 2 is only one example and the systems and methods herein are equally applicable to other types of devices that may include fewer components or more components. For example, while a limited number of print engines and media paths are illustrated in FIG. 2, those ordinarily skilled in the art would understand that many more paper paths and additional print engines could be included within any device used with embodiments herein.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device. An image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like. To render an image is to reduce the image data (or a signal thereof) to viewable form; store the image data to memory or a storage device for subsequent retrieval; or communicate the image data to another device. Such communication may take the form of transmitting a digital signal of the image data over a network.

Figure 3:
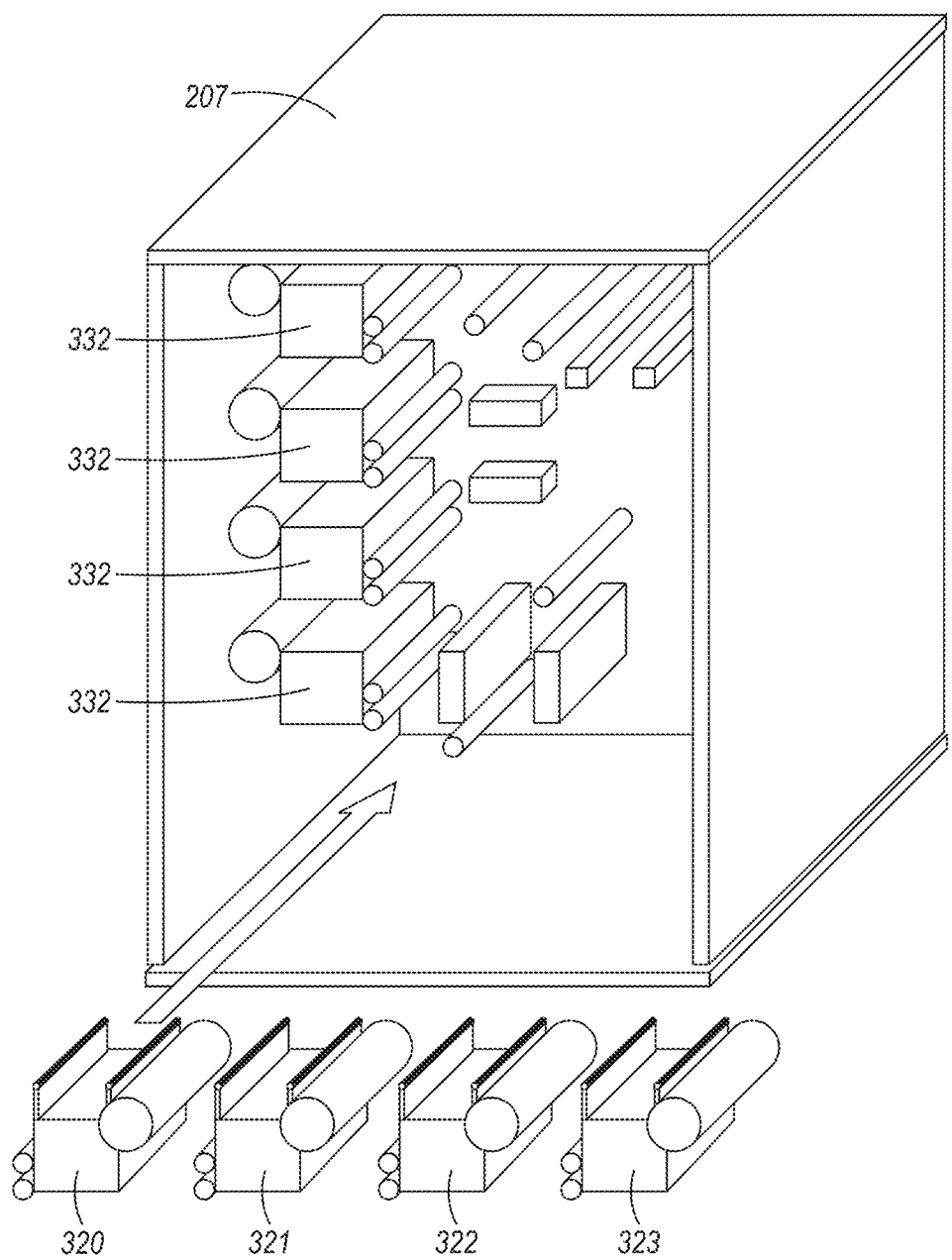
FIGS. 3 and 4 are schematic diagram illustrating the use of replacement printing modules with printing devices herein.

FIG. 3 illustrates a printing device or print engine 207, which is sometimes referred to as an image output terminal (IOT). The print engine 207 includes various main (permanent) printing modules 332 that print using the printer's permanent colors. The main printing modules 332 are used for virtually all print jobs, and are not replaceable by printer users. Typically, the main printing modules 332 are only replaceable as part of a repair operation performed by repair professionals. Thus, replaceable printing modules 320-323 are regularly switched to provide different colors during different printing operations, while the main printing modules 332 are only replaced when they are defective/empty.

Figure 4:
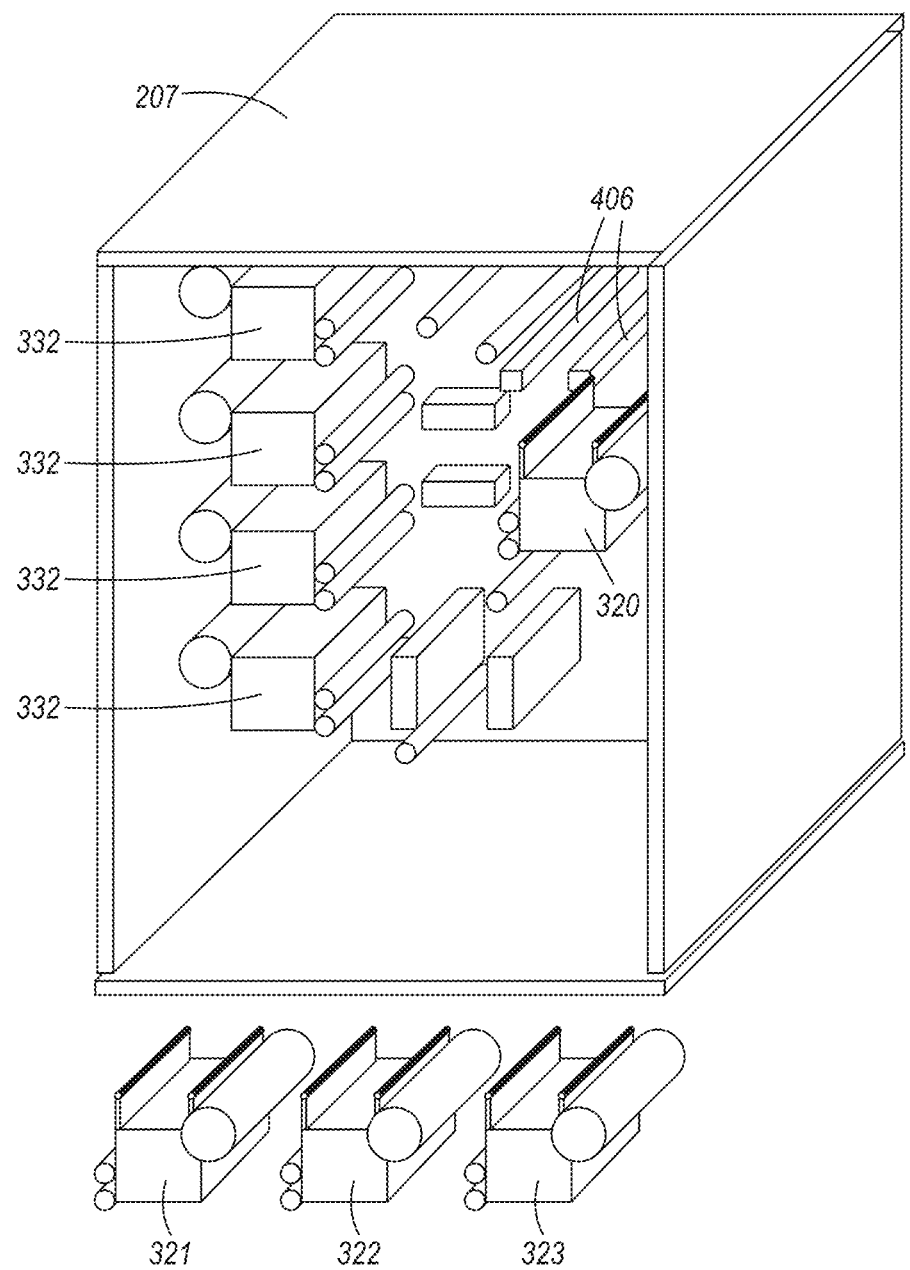

The replaceable printing modules 320-323 are sometimes positioned in a receptacle 406 of the print engine 207, as shown in FIG. 4. Typically, the replaceable printing modules 320-323 print using colors that only appear in a limited number of specialty print jobs. The receptacle 406 can include housing slots that are similarly sized and shaped to match the size and shape of the connections of the replaceable printing modules 320-323, allowing the slots to hold the replaceable printing modules. FIG. 4 illustrates one of the replaceable printing modules 320-323 mounted in the receptacle 406 (i.e., replaceable printing module 320 mounted in receptacle 406).

The color gamut of a printer is a multi-dimensional space of a given volume with the axes of the space being set or defined initially by the pigments used in the colorants of the primary colors. Each set of color primaries: red, green, blue (RGB) or cyan, magenta, yellow, and black (CMYK), defines a "color space" that includes all colors that can result from any combination of these primaries. The "color space," or "color gamut," may be quite different for different sets of primaries. Typically, a CMYK color gamut falls inside (is smaller than) a RGB color gamut, which means that the eye can detect more colors than a printer can print. In forming multi-color output images on an image-receiving medium, each of the primary colors is transferred to the image-receiving medium in turn. The color gamut is defined by the interaction of the primary colors, and is limited by a total amount of colorant in any combination that can be effectively deposited on the image-receiving medium. In other words, it is not possible to print some colors that can be photographed or displayed on a monitor when using CMYK printing. The color gamut for a particular image forming device and an associated color rendition dictionary (CRD) by which images may be produced by the image forming device is usually stored in metadata with the image forming device. The CRD and associated set of set points programmed into the image forming device, or family of image forming devices, ensures that the color gamut produced by that image forming device covers, as broadly as possible, an available standard color spectrum. Typically then, image-forming devices are delivered with a single CRD available in the image production system. For example, the main printing modules 332 may contain colorant for each of the four colors in the CMYK color space. The replaceable printing modules 320-323 may contain specialty spot colorants for silver, gold, white, or clear. These colorants may be used to produce a special imaging effect. Alternatively, or in addition, the replaceable printing modules 320-323 may contain process colorant for colors, such as red, green, blue, orange, or purple. These colorants are used to produce a lager printable color gamut.

Any color space can be used by methods and devices herein including, for example, RGB (red, green, blue), Lab (CIELAB or L*a*b*), YUV (luma (Y') and chrominance (UV)), YCrCb (Y' is the luma component, and CB and CR are the blue-difference and red-difference chroma components), CMYK (cyan, magenta, yellow, black, etc.), etc.

A digital printing system includes one or more decomposers that output page images of decomposed data. A decomposer outputs data relating to a series of discrete page images, each page image corresponding to an individual page to be printed. The output is digital data that can be used to operate, for example, a xerographic or ink-jet marking engine in printer hardware. Typically, a printer has a programmed color space for rendering output; however, when an undefined color (as understood by the DFE) is included in PDL, the printer will use alternate color space information within the PDL. An alternate color space indicates which color values should be mapped to if the output device does not natively display with the programmed color space. The alternate color space could be a Gray, RGB, CMYK, or a CIE based color space.

Within a print job's printer definition language (PDL) file may be color space calls for "extra" colorants. Additionally PDL files could include color calls for spot colorants. For extended color devices that can print with extended gamut colorants, the printer's processor (often referred to as a Digital Front End (DFE 237), above) will understand the capabilities of the attached image output terminal (IOT) or printing engine(s) 207. The extended colorant names (e.g., orange and violet) for the attached IOT will, therefore, be known by the controller/processor 204.

If one or more spot color calls are present, the spot color will also have a name. The spot color name will correspond to a specific combination of pigments, sometimes referred to as a color recipe. The spot color name is compared to a table (for the device object and the extended gamut configuration, if applicable). The table has been previously established from empirical testing (for a given class of printing engines) to determine the use of the process colorants and any extended gamut colorants, if applicable. The table entries for a spot color could also be built "on the fly" using either destination profiles or printer color models for the potential colorant sets. Such previously established table(s) is loaded in memory of the printing device and could be searched using a hash technique.

In some cases, one or more objects included in the PDL file have been represented using a color name that is not supported by the MFD 200. For each such object, the MFD 200 can identify a corresponding alternate color space designation. For example, the object can be associated with at least one alternate color space that can be used to represent the object when the source color name is not supported. An application or an individual, such as a user who generated the object, can specify the alternate color space. Additionally, the alternate color space can be selected such that it is commonly supported by one or more output device types.

Figure 5:
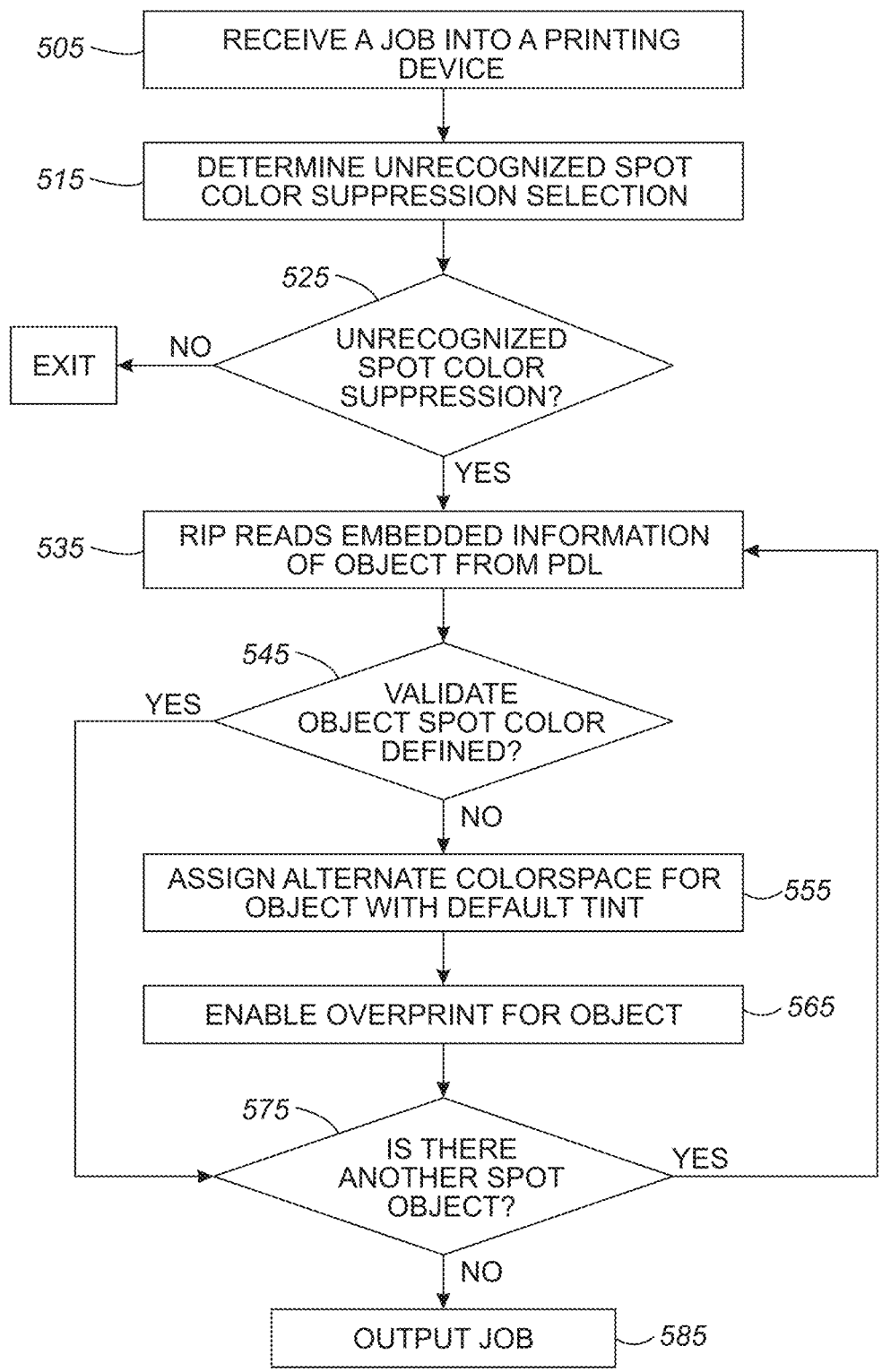
FIG. 5 is a flow chart illustrating methods herein.

Referring to FIG. 5, at 505, a job is input to the printer. At 515, a Common Decomposer Facility (CDF) checks to determine if the user has selected suppression of unrecognized spot colors. User selection can be done on the user interface (GUI) 240, described in more detail below. Determination of Unrecognized Spot Color Suppression can be done by checking to see if a new dictionary (Suppress dict) contains any attribute as true. The attributes of this dictionary may include Attr_SuppressUndefinedSpots (type boolean), Attr_SpecialtySpots (type boolean), and Attr_SpecificSpecialtySpots (type list, this will contain the list of all checked spots under the "Suppress Specialty Specific Spots" option). If none of the attributes are true, at 525, then unrecognized spot color suppression will not be used, and the job will be printed as defined in the PDL and any unrecognized spot color will be printed using the pre-defined alternate color space.

A "Spots" description indicates that "Spots" can be defined within a PDL as either a DeviceN color space or Separation color space. At 535, the RIP will read the embedded information of an object from the PDL. If the object is called to use a spot color, then the RIP will validate if the same spot color is enabled by the user to apply, at 545. That is, the system validates if the spot color name is listed in a color space table for the printer. If yes, then unrecognized spot color suppression is not necessary for that object, so the object will be printed as defined in the PDL.

Otherwise, for the spot color suppression according to systems and methods herein, the RIP will create a new alternate color space for the object that prevents the object with the invalid spot color from printing. In other words, depending upon user preferences (such as the examples shown in FIG. 6 below) the systems and methods herein will automatically prevent the printing of any objects that calls for a spot color that is not valid in item 545. This occurs without user action, and prevents a possible printing defect from occurring. Thus, the systems and methods herein can err on the side of caution by not printing objects that use invalid spot color names (ones that that are not listed in a color space table for the printer), rather than attempting to print such objects and producing objectionable results. This saves valuable resources by avoiding reprinting, and avoiding requiring the user to manually suppress specific objects, because it is less likely that some missing objects will cause a finished job to be rejected, as compared to a finished job with objectionable printed objects. Therefore, the automatic suppression performed herein saves user time and frustration, and printing resources (printing materials, machine time, etc.) The new alternate color space may be given any name (e.g., DeviceCMYK). At 555, the RIP will assign the new alternate color space to the object with default tint value as Cyan=0, Magenta=0, Yellow=0, Black=0. This will make the object invisible. If the object has any underlying object, then the underlying object should show through, otherwise a shape will be observed in the print output as same as the spot object. Also, to serve this purpose, the overprint feature will be enabled, at 565. This will make the underlying objects visible in the final raster. Thus, such settings allow the underlying colors to print, so that the missing object is not as obviously missing; and this again reduces the likelihood that a printed job missing some objects will be objectionable. At 575, the system will determine if there are any more objects calling for spot colors. If so, the RIP will read the embedded information of the next object from the PDL, at 535, and the process will continue, as described. Once all spot objects have been analyzed and color values modified, as necessary, the job is output, at 585.

Figure 6:
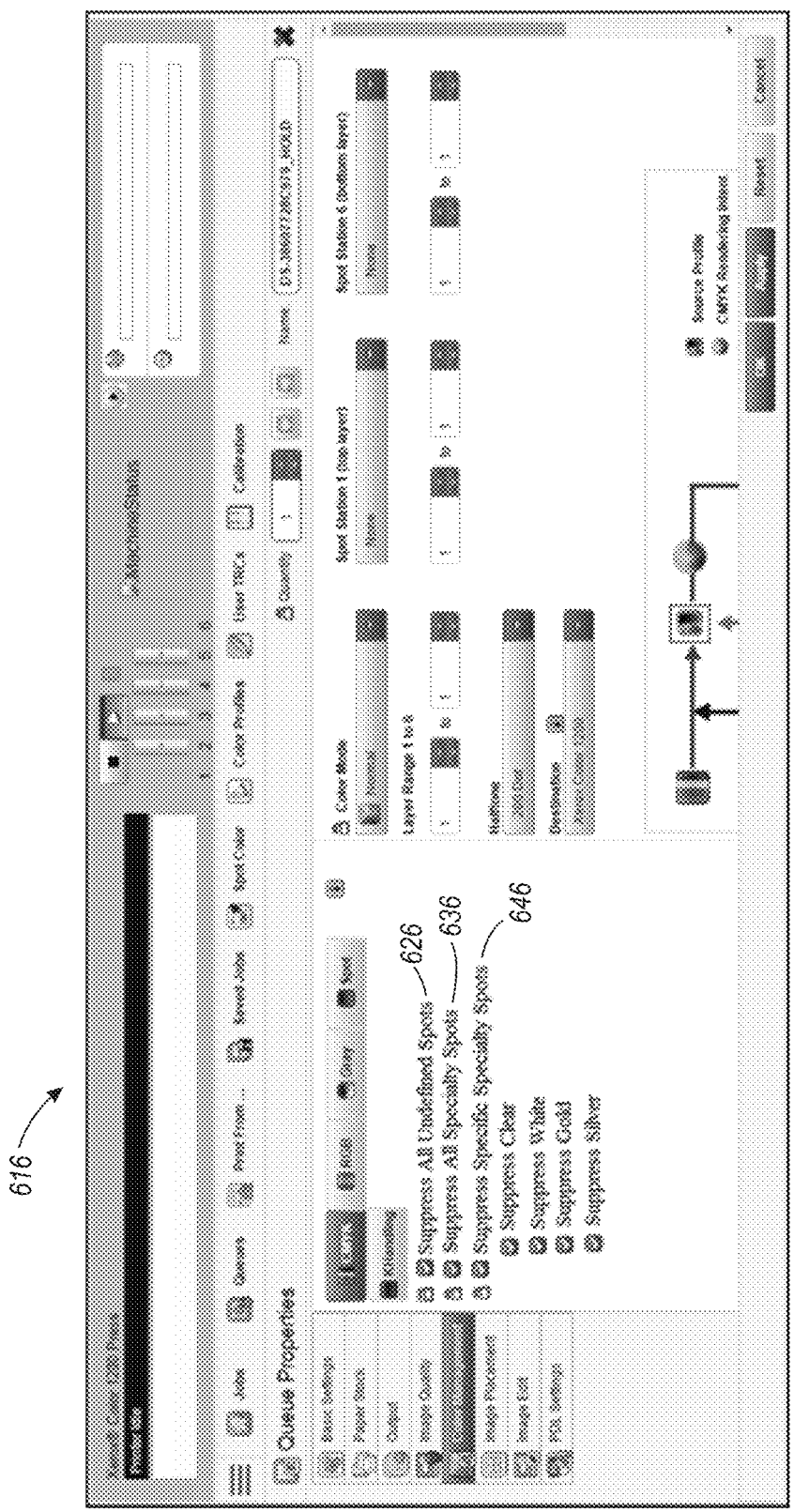
FIG. 6 is an illustration of a user interface according to systems and methods herein.

FIG. 6 shows an exemplary user interface, indicated generally as 616, according to systems and methods herein. The user interface 616 may be a touch sensitive device, as would be known in the art. Among other things, the user interface 616 permits the user to select which spot colors should be suppressed. This may be accomplished using 'radio' buttons for functions, as defined below. While some exemplary options are shown in FIG. 6, many other options could be provided, including variants and combinations of the following.

Suppress all Undefined Spots (626):

In the PDL, if the definition of any spot is not found in predetermined colorant values, then the colors assigned to the spot object are assigned a default tint value of zero. In other words, if a spot name is not understood/recognized by the Spot Color Service, the Spot Color Service performs conversion from the spot name to colorant recipe (e.g., C, M, Y, K values=0) for printing. Overprint is also set to ON to allow underlying objects to show through. As explained above, this set of options will automatically prevent objects with undefined (invalid) spot names from printing, but will allow the underlying colors to print, so that the missing object is not as obviously missing.

Suppress all Specialty Spots (636):

A specialty spot is a colorant supported by the printer (e.g., Clear, Gold, etc.). These names could be determined via the deviceobject. The deviceobject describes the capabilities of the printer including the colorants that are supported (e.g., Cyan, Magenta, Yellow, Black, Clear, Gold). Upon recognizing such specialty spots, the colors assigned to the specialty spot object are assigned a default tint value of zero. Overprint is also set to ON to allow underlying objects to show through. This saves time and printing resources by automatically avoiding objects that use relatively more expensive specialty colorants. For example, one may wish to print a job, but avoid the expense of using relatively more expensive specialty colorants; however, the user does not desire to pursue the laborious task of manually suppressing printing for each and every object that uses such specialty colorants, individually. With one simple option herein, these methods and systems automatically cause all objects that use specialty colorants to not print (however, by allowing markings underlying such suppressed objects, the lack of such objections will not be noticeable, and be potentially less objectionable). In this way, resources and user time are saved, dramatically improving the user experience, while still producing a printed product that is not objectionable.

Suppress Specific Specialty Spots (646):

As the name suggests, this option allows suppressing only selected spots from the list of all available spots supplied by device object. Overprint is also set to ON to allow underlying objects to show through. This is similar to 636; however, it allows finer granularity in the selection of which specialty colorants will not be used. This is useful if one specialty colorant is out of stock, much more expensive than other specialty colorants, etc., while still providing the benefit of saving resources and user time by automatically identifying and suppressing objects that use specific specialty colorants.

As mentioned above, a "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, an RGB-to-YCbCr converter to obtain luminance (Y) and chrominance (Cb, Cr) values. It should be appreciated that pixels may be represented by values other than RGB or YCbCr.

A contone is a characteristic of a color image such that the image has all the values (0 to 100%) of gray (black/white) or color in it. A contone can be approximated by millions of gradations of black/white or color values. The granularity of computer screens (i.e., pixel size) can limit the ability to display absolute contones. The term halftoning means a process of representing a contone image by a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications.

Traditional clustered dot halftones were restricted to a single frequency because they were generated using periodic gratings that could not be readily varied spatially. Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink). Consequently, to emulate the photographic halftone cell, the digital halftone cell must contain groups of monochrome pixels within the same-sized cell area.

Figure 7:
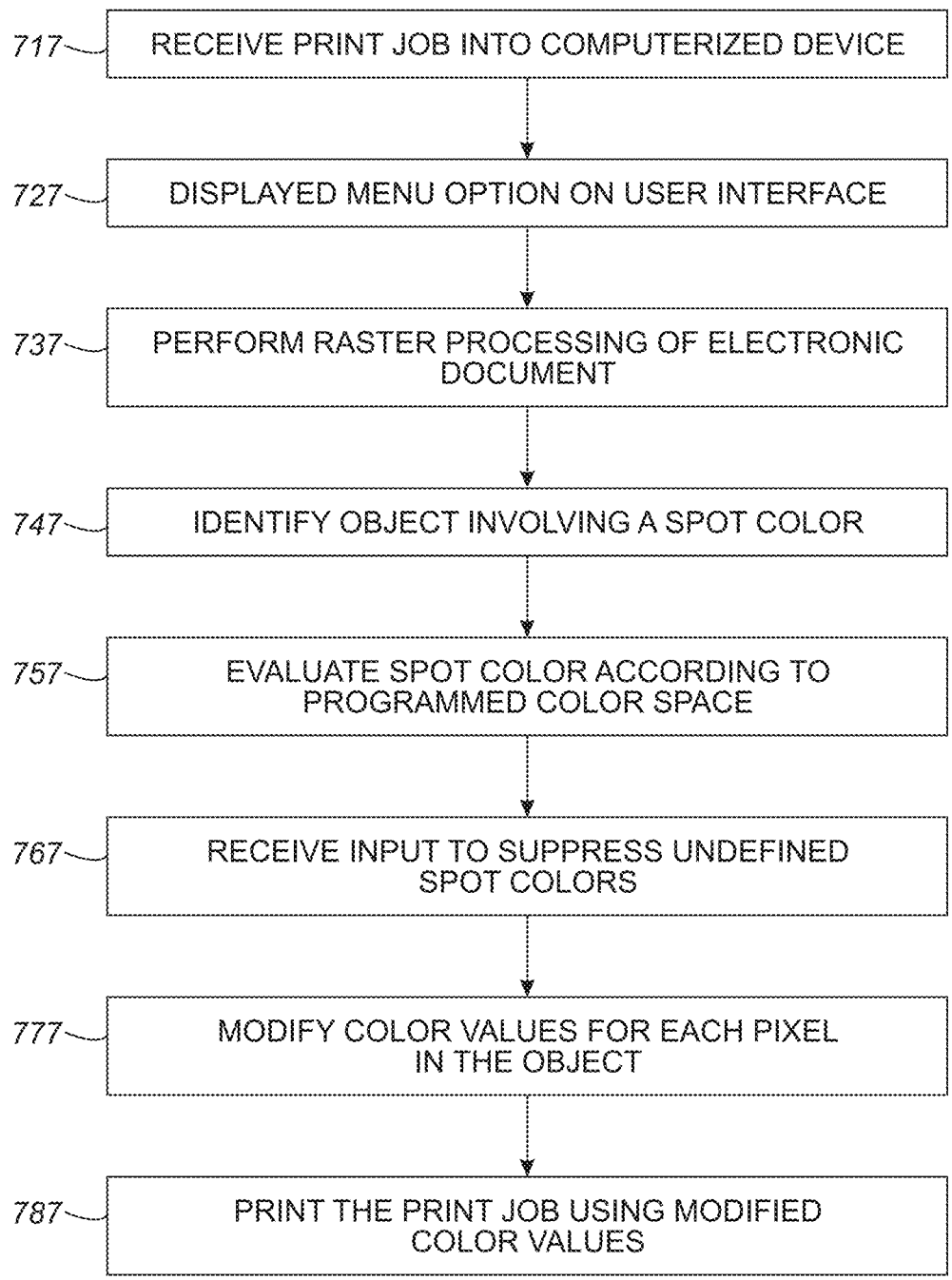
FIG. 7 is a flow chart illustrating methods herein.

FIG. 7 is a flow diagram illustrating the processing flow of an exemplary method to suppress unrecognized spot colors from a raster image according to the present disclosure. At 717, a print job is received into a computerized device. According to systems and methods herein, the computerized device includes a marking device and the print job includes an electronic document. A menu option is displayed on a user interface of the computerized device, in item 727. The menu option enables an operator to suppress spot colors in the electronic document. The spot colors to suppress are selectable. In item 737, Raster processing of the electronic document is performed. The raster processing produces a bitmap including pixel values for each element of the electronic document. In item 747, an object in the electronic document involving a spot color is identified. In item 757, the spot color is evaluated according to a programmed color space of the marking device. At 767, Input is received into the user interface to suppress spot colors that are not defined in the programmed color space. Responsive to the spot color not being defined for the marking device, color values for each pixel in the object are modified to zero, at 777. At 787, the print job is output using modified color values.

FIG. 8 is a general overview block diagram of a network, indicated generally as 807, for communication between the multi-function device 200 and a database 822. The multi-function device 200 may comprise any form of processor as described in detail above. The multi-function device 200 can be programmed with appropriate application software to implement the methods described herein. Alternatively, the multi-function device 200 is a special purpose machine that is specialized for processing image data and includes a dedicated processor that would not operate like a general purpose processor because the dedicated processor has application specific integrated circuits (ASICs) that are specialized for the handling of image processing operations, processing pixel data, etc. In one example, the multi-function device 200 is special purpose machine that includes a specialized card having unique ASICs for providing image processing instructions, includes specialized boards having unique ASICs for input and output devices to speed network communications processing, a specialized ASIC processor that performs the logic of the methods described herein (such as the processing shown in FIGS. 5 and 7) using dedicated unique hardware logic circuits, etc.

Database 822 includes any database or any set of records or data that the multi-function device 200 desires to retrieve. Database 822 may be any organized collection of data operating with any type of database management system. The database 822 may contain matrices of datasets comprising multi-relational data elements.

The database 822 may communicate with the multi-function device 200 directly. Alternatively, the database 822 may communicate with the multi-function device 200 over network 833. The network 833 comprises a communication network either internal or external, for affecting communication between the multi-function device 200 and the database 822.

Figure 9:
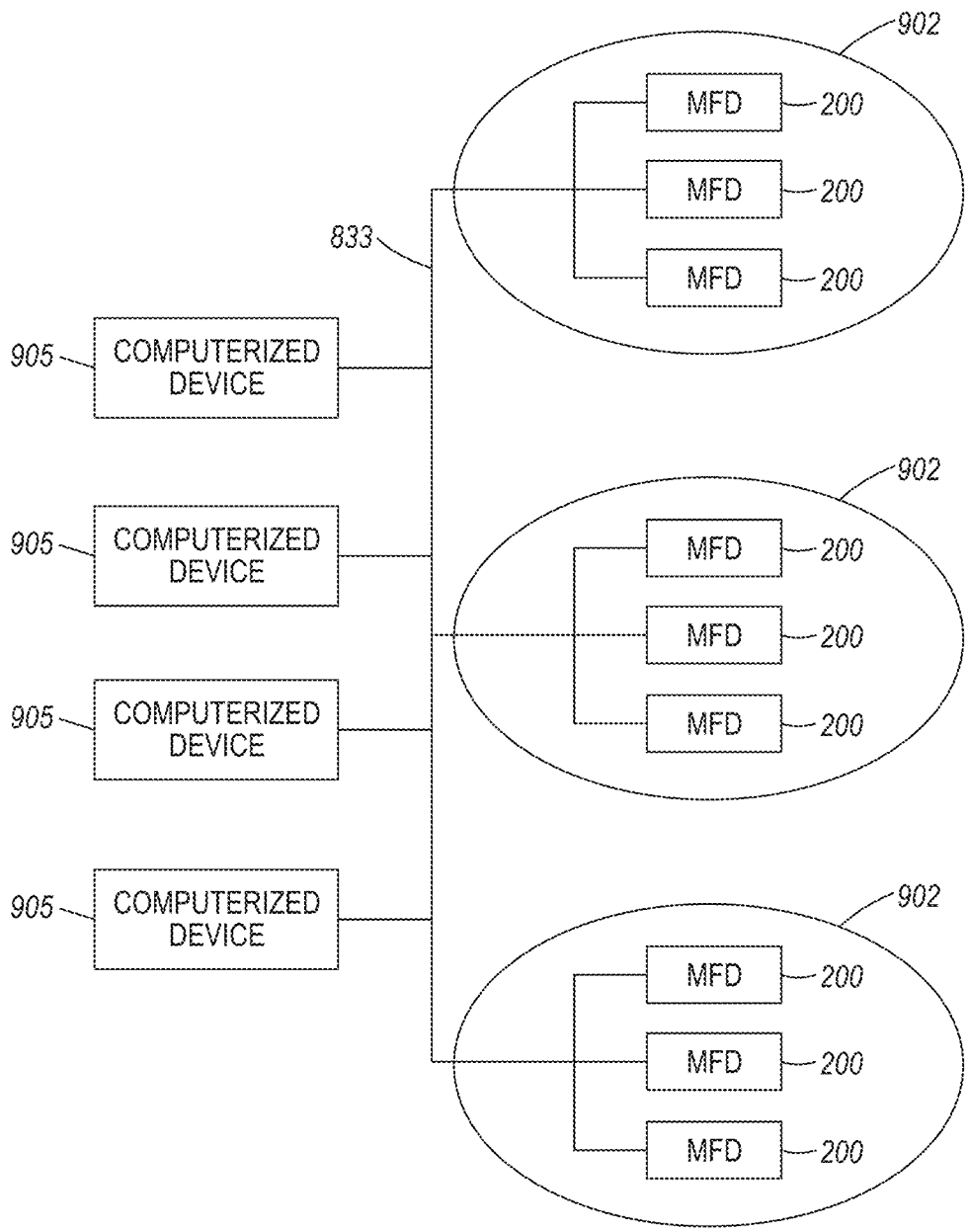
FIG. 9 is a schematic diagram illustrating systems and methods herein.

As shown in FIG. 9, exemplary printers, copiers, multi-function machines, and multi-function devices (MFD) 200 may be located at various different physical locations 902. Other devices according to systems and methods herein may include various computerized devices 905. The computerized devices 905 can include print servers, printing devices, personal computers, etc., and are in communication (operatively connected to one another) by way of the network 833. The network 833 may be any type of network, including a local area network (LAN), a wide area network (WAN), or a global computer network, such as the Internet.

According to a further system and method herein, an article of manufacture is provided, which includes a tangible computer readable medium having computer readable instructions embodied therein for performing the steps of the computer implemented methods, including, but not limited to, the method illustrated in FIGS. 5 and 7. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIGS. 5 and 7.

The computer program instructions may be stored in a computer readable medium that can direct a computer, other programmable data processing apparatus, or other devices to process in a particular manner, such that the instructions stored in the computer readable medium produce an article of manufacture including instructions which implement the process/act specified in the flowchart and/or block diagram block or blocks.

The hardware described herein plays a significant part in permitting the foregoing method to be performed, rather than function solely as a mechanism for permitting a solution to be achieved more quickly, (i.e., through the utilization of a computer for performing calculations). Specifically, printers, scanners, and image processors that alter electronic documents each play a significant part in the methods (and the methods cannot be performed without these hardware elements). Therefore, these hardware components are fundamental to the methods being performed and are not merely for the purpose of allowing the same result to be achieved more quickly.

As would be understood by one ordinarily skilled in the art, the processes described herein cannot be performed by human alone (or one operating with a pen and a pad of paper) and instead such processes can only be performed by a machine. Specifically, processes such as printing, scanning, raster image processing, electronically altering color schemes using an image processor, etc., require the utilization of different specialized machines. Therefore, for example, the printing/scanning performed by the user device cannot be performed manually (because it can only be done by printing and scanning machines) and is integral with the processes performed by methods herein. In other words, these various machines are integral with the methods herein because the methods cannot be performed without the machines (and cannot be performed by humans alone).

As will be appreciated by one skilled in the art, aspects of the devices and methods herein may be embodied as a system, method, or computer program product. Accordingly, aspects of the present disclosure may take the form of an entirely hardware system, an entirely software system (including firmware, resident software, micro-code, etc.) or a system combining software and hardware aspects, which may all generally be referred to herein as a 'circuit', 'module, or 'system.' Furthermore, aspects of the present disclosure may take the form of a computer program product embodied in one or more computer readable medium(s) having computer readable program code embodied thereon.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, the claims presented below are not intended to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, processors, etc., are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, print engines, etc., are well known, and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The terminology used herein is for the purpose of describing particular examples of the disclosed structures and methods and is not intended to be limiting of this disclosure. For example, as used herein, the singular forms 'a', 'an', and 'the' are intended to include the plural forms as well, unless the context clearly indicates otherwise. Additionally, as used herein, the terms 'comprises', 'comprising', 'includes', and/or 'including', when used in this specification, specify the presence of stated features, integers, steps, operations, elements, and/or components, but do not preclude the presence or addition of one or more other features, integers, steps, operations, elements, components, and/or groups thereof. Further, the terms 'automated' or 'automatically' mean that once a process is started (by a machine or a user), one or more machines perform the process without further input from any user.

The corresponding structures, materials, acts, and equivalents of all means or step plus process elements in the claims below are intended to include any structure, material, or act for performing the process in combination with other claimed elements as specifically claimed. The descriptions of the various devices and methods of the present disclosure have been presented for purposes of illustration, but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

It will be appreciated that the above-disclosed and other features and processes, or alternatives thereof, may be desirably combined into many other different systems or applications. Those skilled in the art may subsequently make various presently unforeseen or unanticipated alternatives, modifications, variations, or improvements therein, which are also intended to be encompassed by the following claims. Unless specifically defined in a specific claim itself, steps or components of the systems and methods herein should not be implied or imported from any above example as limitations to any particular order, number, position, size, shape, angle, color, temperature, or material.

What is claimed is:

1. A method of suppressing unrecognized spot colors, the method comprising:
   receiving a print job into a computerized device comprising a marking device having a programmed color space, said print job comprising an electronic document and print job attributes for use in rendering said print job;
   performing raster processing of said electronic document;
   identifying an object in said electronic document, wherein said object calls for a spot color, and wherein said spot color is not defined in said programmed color space of said marking device; and
   responsive to said spot color not being defined in said programmed color space of said marking device,
   suppressing said spot color for said object by creating an alternate color space for said marking device, said alternate color space having tint values of zero for every color in said alternate color space, and
   assigning said object to said alternate color space.

2. The method according to claim 1, further comprising:
   outputting said print job having modified color values using said marking device.

3. The method according to claim 2, further comprising:
   causing said marking device to render said object using overprint so that other objects occupying the same image region of said electronic document are not obscured.

4. The method according to claim 1, said raster processing producing a bitmap comprising pixel values for each element of said electronic document.

5. The method according to claim 1, said electronic document comprising page description language (PDL), said method further comprising:
   said raster processing comprising reading embedded information in said object from said PDL.

6. The method according to claim 1, said programmed color space comprising cyan, magenta, yellow, and black (CMYK).

7. The method according to claim 6, wherein said alternate color space includes default tint values as Cyan=0, Magenta=0, Yellow=0, and Black=0.

8. A method of suppressing unrecognized spot colors from a raster image, the method comprising:
   receiving a print job into a computerized device comprising a marking device, said print job comprising an electronic document;
   displaying, on a user interface of said computerized device, a menu option to suppress spot colors in said electronic document, said spot colors to suppress being selectable;
   performing raster processing of said electronic document, said raster processing producing a bitmap comprising pixel values for each element of said electronic document;
   identifying an object in said electronic document, wherein said object calls for a spot color;
   evaluating said spot color according to a programmed color space of said marking device;
   determining said spot color is not defined in said programmed color space of said marking device;
   receiving input into said user interface to suppress spot colors that are not defined in said programmed color space of said marking device;
   responsive to said spot color not being defined in said programmed color space of said marking device,
   suppressing said spot color for said object by creating an alternate color space for said marking device, said alternate color space having tint values of zero for every color in said alternate color space, and
   assigning said object to said alternate color space; and
   outputting said print job using modified color values.

9. The method according to claim 8, further comprising:
   causing said marking device to render said object using overprint so that other objects occupying the same image region of said electronic document are not obscured.

10. The method according to claim 8, said electronic document comprising page description language (PDL), said method further comprising:
    said raster processing comprising reading embedded information in said object from said PDL.

11. The method according to claim 8, said programmed color space comprising cyan, magenta, yellow, and black (CMYK).

12. The method according to claim 11, wherein said alternate color space includes default tint values as Cyan=0, Magenta=0, Yellow=0, and Black=0.

13. The method according to claim 8, said marking device supporting specialty colors, said receiving input into said user interface to suppress spot colors that are not defined in said programmed color space further comprising:
    receiving input into said user interface to suppress only said specialty colors.

14. The method according to claim 13, further comprising:
    receiving input into said user interface to suppress only selected ones of said specialty colors.

15. A printing device, comprising:
    an input device receiving a print job, said print job comprising an electronic document;
    a processor operatively connected to said input device, said processor comprising a raster image processor;
    a user interface operatively connected to said processor; and
    a marking device operatively connected to said processor, said marking device having a programmed color space,
    said processor displaying, on said user interface, a menu option to suppress spot colors in said electronic document, said spot colors to suppress being selectable,
    said processor performing raster processing of said electronic document, using said raster image processor, said raster processing producing a bitmap comprising pixel values for each element of said electronic document,
    said processor identifying an object in said electronic document, wherein said object calls for a spot color,
    said processor evaluating said spot color according to said programmed color space of said marking device,
    said processor determining that said spot color is not defined in said programmed color space of said marking device, said user interface receiving input to suppress spot colors that are not defined in said programmed color space of said marking device,
responsive to said spot color not being defined in said programmed color space of said marking device,
said processor suppressing said spot color for said object by creating an alternate color space for said marking device, said alternate color space having tint values of zero for every color in said alternate color space, and
said processor assigning said object to said alternate color space, and
outputting said print job using modified color values, using said marking device.

16. The printing device according to claim 15, further comprising:
responsive to said spot color not being defined in said programmed color space of said marking device, said processor causing said marking device to render said object using overprint so that other objects occupying the same image region of said electronic document are not obscured.

17. The printing device according to claim 15, said electronic document comprising page description language (PDL), said processor performing raster processing further comprising said processor reading embedded information in said object from said PDL.

18. The printing device according to claim 15, said programmed color space for said marking device comprising cyan, magenta, yellow, and black (CMYK).

19. The printing device according to claim 18, wherein said alternate color space includes default tint values as Cyan=0, Magenta=0, Yellow=0, and Black=0.

20. The printing device according to claim 15, said marking device supporting specialty colors, said receiving input into said user interface to suppress spot colors that are not defined in said programmed color space further comprising:
receiving input into said user interface to suppress only selected specialty colors.

* * * * *